(12) United States Patent
Kellner et al.

(10) Patent No.: US 11,565,579 B2
(45) Date of Patent: Jan. 31, 2023

(54) ELECTRIC VEHICLE HAVING A BATTERY IN AN UNDERFLOOR ARRANGEMENT

(71) Applicant: Dr. Ing. h.c. F. Porsche Aktiengesellschaft, Stuttgart (DE)

(72) Inventors: Philipp Kellner, Renningen (DE); Jens Bohlien, Stuttgart (DE); Sascha Mostofi, Zeltingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 78 days.

(21) Appl. No.: 16/871,137

(22) Filed: May 11, 2020

(65) Prior Publication Data

US 2020/0353807 A1  Nov. 12, 2020

(30) Foreign Application Priority Data

May 9, 2019 (DE) ...................... 10 2019 112 105.1

(51) Int. Cl.
| | |
|---|---|
| *B60K 1/00* | (2006.01) |
| *B60K 1/04* | (2019.01) |
| *B62D 27/06* | (2006.01) |
| *B60L 53/16* | (2019.01) |
| *B60L 53/12* | (2019.01) |
| *B60L 58/10* | (2019.01) |
| *H01M 10/42* | (2006.01) |
| *H01M 10/613* | (2014.01) |

(Continued)

(52) U.S. Cl.
CPC ................ *B60K 1/04* (2013.01); *B60L 53/12* (2019.02); *B60L 53/16* (2019.02); *B60L 58/10* (2019.02); *B62D 25/2072* (2013.01); *B62D 27/065* (2013.01); *H01M 10/4257* (2013.01); *H01M 10/613* (2015.04); *H01M 10/625* (2015.04); *H01M 10/6556* (2015.04); *H01M 50/20* (2021.01); *B60K 2001/005* (2013.01); *B60K 2001/0438* (2013.01); *H01M 2010/4271* (2013.01); *H01M 2220/20* (2013.01)

(58) Field of Classification Search
CPC ........... B60K 1/04; B60L 50/64; B60L 50/51; H01M 50/26; H01M 10/613; H01M 10/625
USPC ....................................................... 180/68.5
See application file for complete search history.

(56) References Cited

U.S. PATENT DOCUMENTS

| | | |
|---|---|---|
| 5,927,938 A | 7/1999 | Hammerslag |
| 9,359,742 B2 * | 6/2016 | Adachi ................... B60L 50/66 |

(Continued)

FOREIGN PATENT DOCUMENTS

| | | |
|---|---|---|
| DE | 10 2009 006 990 | 8/2010 |
| WO | 2017/075523 | 5/2017 |

OTHER PUBLICATIONS

German Examination Report dated Mar. 26, 2020.

*Primary Examiner* — Hau V Phan
(74) *Attorney, Agent, or Firm* — Gerald E. Hespos; Michael J. Porco

(57) ABSTRACT

An electric vehicle (1) has a battery (2) in an underfloor arrangement. The battery (2) is arranged in a battery space (4) that is delimited by body members (5, 6, 7, 8) of a body (3). The battery space (4) also is delimited at a bottom side of the electric vehicle (1) by way of a protective plate (9). The battery (2) has a connection element (10, 11) at least on a side oriented toward one of the body members (7, 8), and the body member (7, 8) has a recess (12, 13) in which the connection element (10, 11) is arranged.

17 Claims, 3 Drawing Sheets

(51) Int. Cl.
    *H01M 10/625*     (2014.01)
    *H01M 10/6556*     (2014.01)
    *B62D 25/20*     (2006.01)
    *H01M 50/20*     (2021.01)

(56) References Cited

U.S. PATENT DOCUMENTS

| | | |
|---|---|---|
| 9,859,593 B2 * | 1/2018 | Herntier ............. H01M 10/613 |
| 10,870,340 B2 * | 12/2020 | Acikgoez ................ B60K 1/04 |
| 2005/0274556 A1 | 12/2005 | Chaney |
| 2010/0114762 A1 | 5/2010 | Ishii |
| 2012/0129029 A1 * | 5/2012 | Yi ............................ B60K 1/04 |
| | | 429/100 |
| 2012/0175900 A1 | 7/2012 | Rawlinson |
| 2013/0153317 A1 * | 6/2013 | Rawlinson ........... B62D 25/025 |
| | | 180/68.5 |
| 2016/0226041 A1 * | 8/2016 | Jackson ................ H01M 50/20 |
| 2017/0149035 A1 * | 5/2017 | Sham ..................... B60L 50/64 |
| 2017/0153281 A1 * | 6/2017 | Barth ..................... G01R 31/52 |
| 2017/0225557 A1 | 8/2017 | Newman |
| 2017/0225662 A1 * | 8/2017 | Newman .............. H01M 50/20 |
| 2018/0126857 A1 * | 5/2018 | Kelly-Morgan ........ B60L 50/51 |
| 2018/0154754 A1 * | 6/2018 | Rowley ................... B60K 1/04 |
| 2018/0272853 A1 * | 9/2018 | Wang ..................... H01M 50/26 |
| 2018/0337377 A1 * | 11/2018 | Stephens ................ B60L 50/64 |
| 2019/0047419 A1 * | 2/2019 | Kellner .................. B60L 50/64 |

* cited by examiner

ELECTRIC VEHICLE HAVING A BATTERY IN AN UNDERFLOOR ARRANGEMENT

CROSS REFERENCE TO RELATED APPLICATION

This application claims priority under 35 USC 119 to German Patent Appl. No. 10 2019 112 105.1 filed on May 9, 2019, the entire disclosure of which is incorporated herein by reference.

BACKGROUND

Field of the Invention

The invention relates to an electric vehicle having a battery in an underfloor arrangement, wherein the battery is arranged in a battery space that is delimited by body members of a body, wherein the battery space is delimited at a bottom side of the electric vehicle by a protective plate.

Related Art

Electrically or partly electrically driveable vehicle have numerous battery cells connected together to form a traction battery. A traction battery often has more than a hundred battery cells, and sometimes up to several thousand battery cells. The battery cells of a traction battery are connected together to form subassemblies called battery modules. The battery modules of a traction battery typically have an identical number of battery cells that are connected together to form the traction battery.

DE 10 2009 006 990 A1 discloses a traction battery arranged in a closed vehicle tunnel. The closed vehicle tunnel has a U-shaped tunnel part and a floor panel.

WO 2017/075523 A2 describes a traction battery having a battery housing. The traction battery is arranged in a battery space that is delimited by longitudinal and transverse members of a motor vehicle.

U.S. Pat. No. 8,567,849 B2 discloses a battery in a battery space of an underfloor arrangement that is delimited by body members of a motor vehicle.

It is an object of the present invention to provide an electric vehicle that has an expedient connection of the battery integrated into the body while being optimized in terms of installation space.

SUMMARY

The invention relates to an electric vehicle with battery to have a connection element at least on a side oriented toward one of the body members. The body member has a recess in which the connection element is arranged.

Installation space required by the connection element of the battery therefore is formed by the recess in the body member. The connection element of the battery can have a wide range of functions such as a function for electrical connection and/or a function for cooling or heating temperature control connection. For example, the connection element may have: a high-voltage connection that leads to an electric motor that enables the electric vehicle to be driven; and/or a high-voltage connection that leads to a battery control unit; and/or a high-voltage connection that leads to a charging socket; and/or a high-voltage connection that leads to an apparatus for inductive charging; and/or a low-voltage connection that leads to a battery control unit; and/or a cooling media connection that controls the temperature of the battery; and/or both a cooling media connection and a power connection that controls the temperature of the traction battery.

The battery of the electric vehicle may be a traction battery.

The structural arrangement of the battery in the body is particularly advantageous when the recess in the body member or the recess in the body members is open toward the bottom. In this case, the battery with the connection element or the connection elements can be inserted easily from below into the body into the recess of the body member associated with the connection element.

The protective plate then may close the battery space toward the bottom.

The battery space may be surrounded to the top, on both sides, and to the front and to the rear by way of the body that has the body members. The mentioned indications relate to the conventional direction indications in a vehicle, specifically an electric vehicle.

The protective plate may be secured both to the body and to the connection element.

The body members may have two or more recesses respective connection elements are arranged.

The one or more recesses may be formed in a front body member in front of the battery and/or in a rear body member behind the battery.

The connection element may comprise at least one region formed from plastic and/or at least one region formed from metal such as an aluminum die casting.

The at least one connection element and the battery may form an assembly unit. The connection element or the connection elements are connected to the battery in advance and are inserted together with the battery from below into the body and secured, in particular screwed. The connection element or the connection elements may be screwed to the body and to the protective plate.

To protect against electromagnetic radiation, the body, the connection element or the connection elements and the protective plate may form a Faraday cage. To this end, the connection points are dense in terms of electromagnetic compatibility; and therefore have narrow screwing distances, metal contacts, no large holes and the like.

The body, the at least one connection element and the protective plate preferably together seal off the battery space. Sealing off is effected, for example, against external environmental influences. As an alternative or in addition, the sealing off can be acoustic sealing off, with the result that acoustic secondary measures in the interior in front of or above the battery installation space can be reduced. To this end, weight, costs and installation space can also be saved as a secondary effect.

The electric vehicle according to the invention and the developments thereof cause significant saving relating to installation space, costs and weight and enable simple assembly that is suitable for large series production.

Further features of the invention will emerge from the appended drawing and from the description of the exemplary embodiments depicted in the drawing, without the invention being restricted thereto.

DETAILED DESCRIPTION

Figure 1:
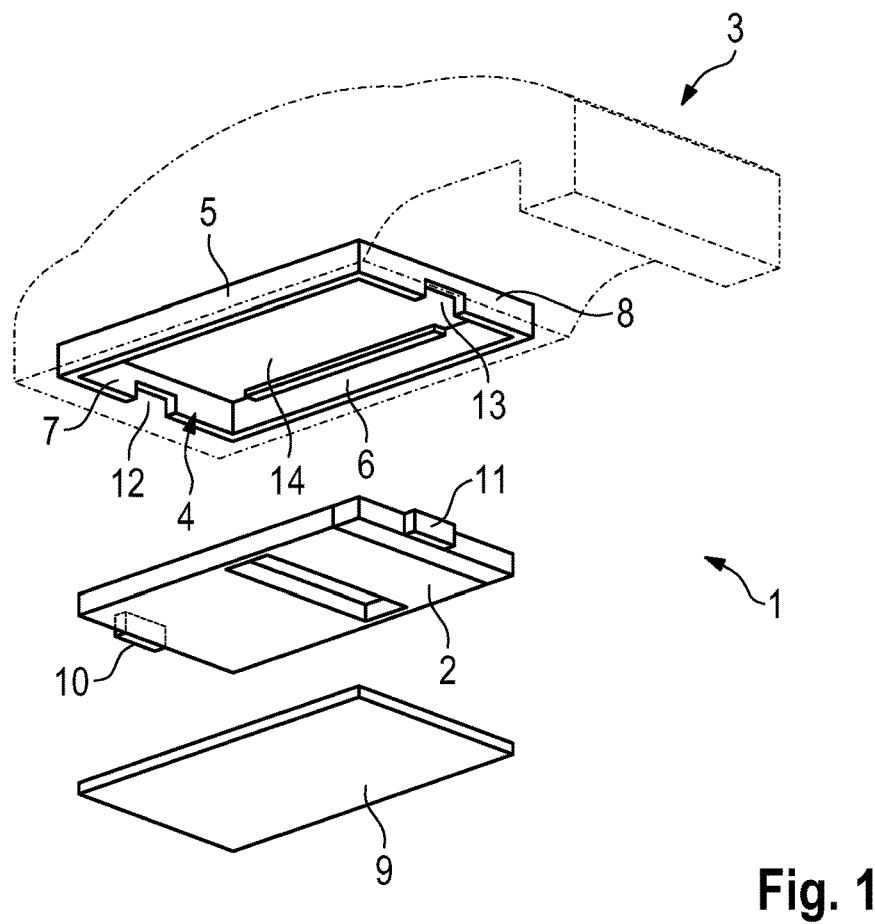
FIG. 1 is an exploded perspective view of the body, battery with connection elements and protective plate of a first embodiment, as seen obliquely from behind and obliquely from below.
Figure 2:
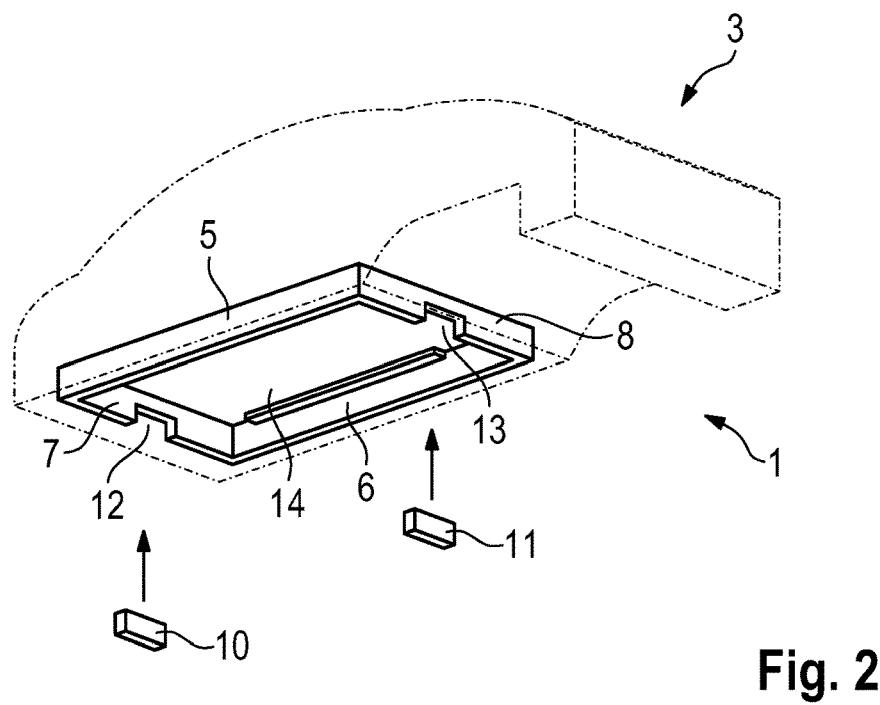
FIG. 2 is a perspective view showing the arrangement of FIG. 1 with only the body and the connection elements of the first embodiment before the connection elements are inserted into recesses of transverse members of the body.

A first embodiment is illustrated in FIGS. 1 and 2 and is directed to an electric vehicle 1 with a battery 2 designed as a traction battery in an underfloor arrangement. The battery 2 is inserted from below into a body 3 and connected thereto. More particularly, the battery 2 is arranged in a battery space 4 that is delimited by body members of the body 3. The body members include, with respect to a conventional orientation of the electric vehicle 1, lateral longitudinal members 5, 6, a front transverse member 7 and a rear transverse member 8. The battery space 4 is delimited at a bottom side of the electric vehicle 1, therefore on a side of the electric vehicle 1 oriented toward the road, by a protective plate 9.

The battery 2 has on its sides oriented toward the transverse members 7 and 8 connection elements that can be assembled, namely a front connection element 10 associated with the front transverse member 7 and a rear connection element 11 associated with the rear transverse member 8. The front connection element 10 has a temperature control and high-voltage connection. The rear connection element 11 has only a high-voltage connection.

The front transverse member 7 has a recess 12, in which the connection element 10 is arranged. The rear transverse member 8 has a recess 13, in which the rear connection element 11 is arranged. The recesses 12 and 13 are opened toward the bottom.

The battery space 4 is surrounded to the top, on both sides, and to the front and to the rear by way of the body 3. This is effected by the longitudinal members 5, 6, the transverse members 7, 8 and a floor panel 14 of the body 3. The protective plate 9 is dimensioned to cover the frame-shaped arrangement of the longitudinal members 5, 6 and transverse members 7, 8. Therefore, when the protective plate 9 is connected thereto, the battery space 4 is closed toward the bottom by way of the protective plate 9. The protective plate 9 is secured both to the longitudinal members 5, 6 and the transverse members 7, 8 and also to the connection elements 10, 11. The securing is effected by screws that penetrate the protective plate 9 and are screwed into the longitudinal members 5, 6 and transverse members 7, 8. Means for securing the battery 2 to the body 3 are not illustrated in more detail.

The respective connection element 10 or 11 consists substantially of plastic or metal, in particular of an aluminum die casting, apart from the direct connection region. The connection elements 10, 11 and the battery 2 form an assembly unit. The connection elements 10, 11 therefore are connected to the battery 2 in advance and are inserted into the body 3 and screwed together with the battery 2 from below. The connection elements 10, 11 are screwed both to the body 3 and to the protective plate 9. The body 3, the connection elements 10, 11 and the protective plate 9 form a Faraday cage. To this end, the connection points are embodied to be dense in terms of electromagnetic compatibility; they therefore have narrow screwing distances, metal contacts, no large holes, etc. The body 3, the connection elements 10, 11 and the protective plate 9 together seal off the battery space 4 from external environmental influences. Furthermore, the body 3, the connection elements 10, 11 and the protective plate 9 together seal off the battery space 4 acoustically, with the result that acoustic secondary measures in the interior in front of or above the battery space 4 can be reduced. An encircling seal 15 is between the protective plate 9 and the longitudinal members 5, 6 and the transverse members 7, 8.

Figure 3:
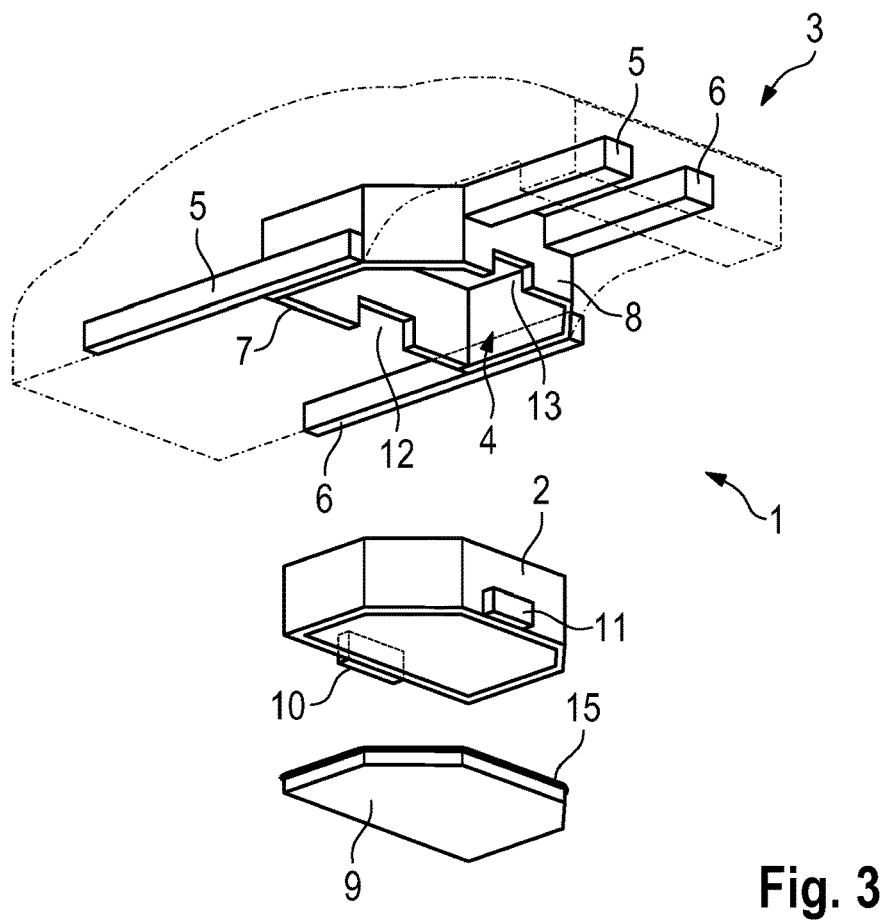
FIG. 3 is an exploded perspective view of the body, battery with connection elements and protective plate of a second embodiment, as seen obliquely from behind and obliquely from below.
Figure 4:
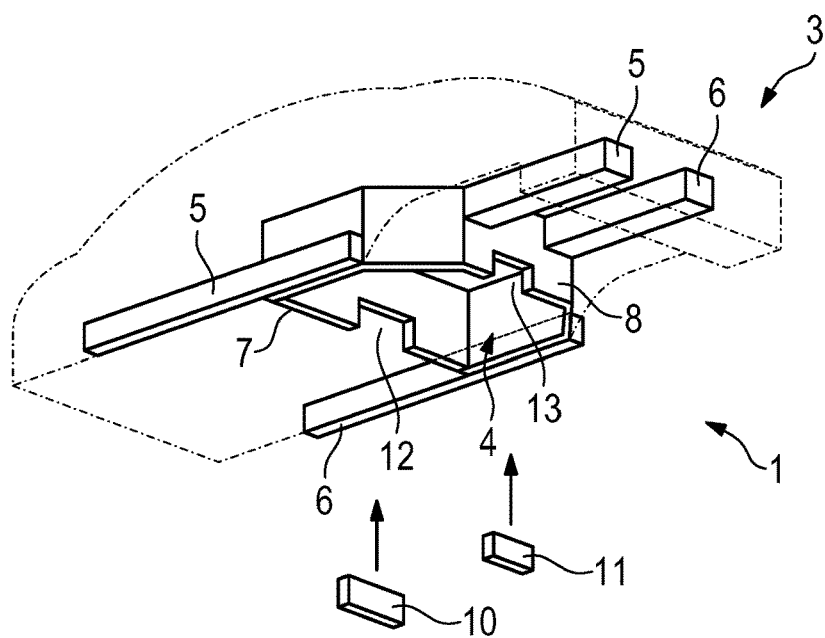
FIG. 4 is a perspective view showing the arrangement of FIG. 3 with only the body and the connection elements of the second embodiment before the connection elements are inserted into recesses of transverse members of the body.
Figure 5:
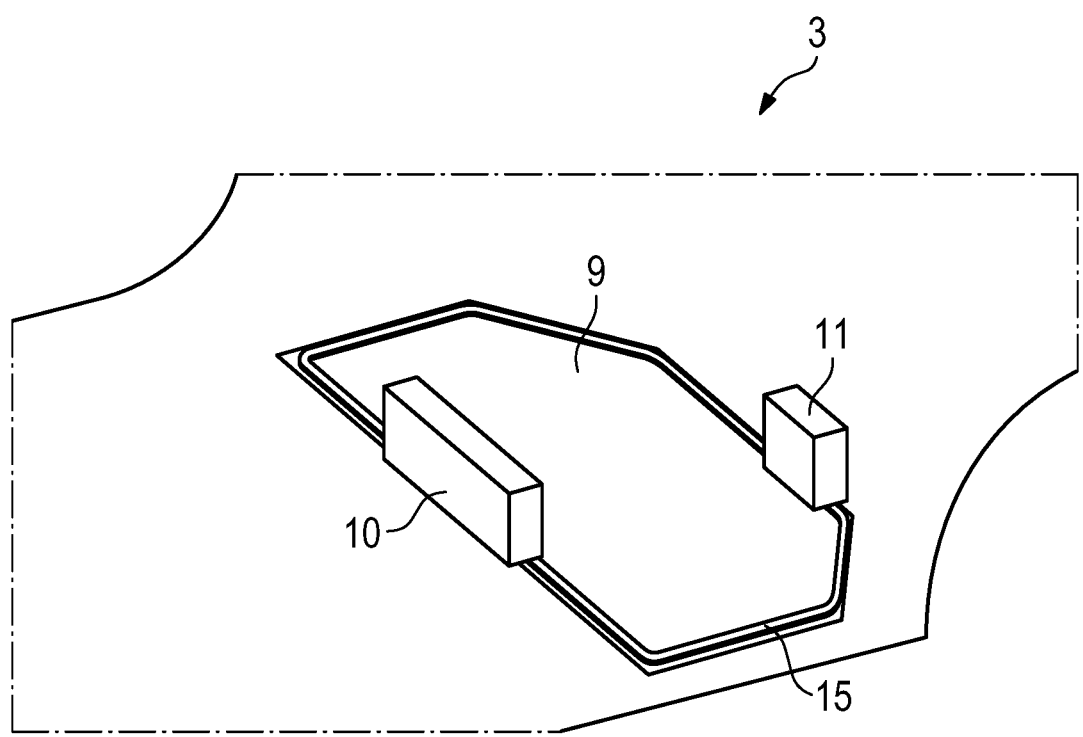
FIG. 5 shows for the transparently illustrated body of the second embodiment with connection elements and the protective plate as seen obliquely from above and obliquely from in front.

The second embodiment of FIGS. 3 to 5 differs from the first embodiment of FIGS. 1 and 2 essentially in that the battery 2 is not arranged between longitudinal members of the electric vehicle 1 that form side sills but is in a region of the electric vehicle located farther to the rear, adjacent to and in front of a rear axle of the electric vehicle. Components of the embodiment of FIGS. 3 to 5 that correspond to the embodiment of FIGS. 1 and 2 are denoted by the same reference signs for the sake of simplicity. In this respect, in terms of the second embodiment, reference is made to the detailed descriptions regarding the first embodiment. The seal 15 is arranged in an encircling manner on the top side of the floor panel 14 in the edge region thereof.

What is claimed is:

1. An electric vehicle comprising:
   a body with body members forming a battery space at a bottom side of the electric vehicle, the body members of the body that form the battery space including a downwardly projecting peripheral wall that defines a downwardly facing opening to the battery space, the peripheral wall including at least one downwardly open recess extending through the peripheral wall adjacent the opening to the battery space;
   a battery fit in the battery space via the downwardly facing opening defined by the peripheral wall;
   at least one electrical connection element projecting from the battery, the at least one electrical connection element being fit in the at least one recess, in the peripheral wall and the at least one electrical connection element being secured directly to the peripheral wall; and
   a protective plate mounted to the peripheral wall and covering the battery, the protective plate further covering and being connected directly to the at least one electrical connection element that is fit in the recess in the peripheral wall.

2. The electric vehicle of claim 1, wherein the battery is a traction battery.

3. The electric vehicle of claim 1, wherein the body members of the body surround the battery space toward a top, both sides, a front and a rear of the body.

4. The electric vehicle of claim 1, wherein the at least one connection element is screwed to the body and to the protective plate.

5. The electric vehicle of claim 1, wherein the body, the at least one connection element and the protective plate form a Faraday cage.

6. The electric vehicle of claim 1, wherein the body, the at least one connection element and the protective plate together seal off the battery space.

7. The electric vehicle of claim 1, wherein the connection element has a high-voltage connection that leads to an electric motor that drives the electric vehicle.

8. The electric vehicle of claim 1, wherein the connection element has a high-voltage connection that leads to a battery control unit.

9. The electric vehicle of claim 1, wherein the connection element has a high-voltage connection that leads to a charging socket and/or to an apparatus for inductive charging.

10. The electric vehicle of claim 1, wherein the connection element has a low-voltage connection that leads to a battery control unit.

11. The electric vehicle of claim 1, wherein the connection element has a cooling media connection to control the temperature of the battery.

12. The electric vehicle of claim 1, wherein the connection element has both a power connection and a cooling media connection.

13. The electric vehicle of claim 1, wherein the at least one recess comprises plural recesses in the body members, and the at least one connection element comprises plural connection elements arranged respectively in the plural recesses.

14. The electric vehicle of claim 13, wherein the plural recesses comprise a front recess formed in a front body member in front of the battery and a rear recess formed in a rear body member behind the battery.

15. The electric vehicle of claim 1, wherein the recess is formed in a front body member in front of the battery or in a rear body member behind the battery.

16. The electric vehicle of claim 1, wherein the connection element consists substantially of plastic or metal, apart from a direct connection region.

17. The electric vehicle of claim 1, wherein the at least one connection element and the battery form an assembly unit.

* * * * *